(12) United States Patent
Fedyay et al.

(10) Patent No.: US 9,774,936 B2
(45) Date of Patent: Sep. 26, 2017

(54) AUDIO SYSTEMS FOR GENERATING SOUND ON PERSONAL WATERCRAFT AND OTHER RECREATIONAL VEHICLES

(71) Applicant: VISTA ACQUISITIONS INC., Kitchener (CA)

(72) Inventors: Roman Fedyay, Richmond Hill (CA); Eddie Guan Hung Chan, Richmond Hill (CA)

(73) Assignee: VISTA ACQUISITIONS INC., Kitchener (CA)

( * ) Notice: Subject to any disclaimer, the term of this patent is extended or adjusted under 35 U.S.C. 154(b) by 0 days.

(21) Appl. No.: 14/912,477

(22) PCT Filed: Aug. 21, 2013

(86) PCT No.: PCT/CA2013/000734
§ 371 (c)(1),
(2) Date: Feb. 17, 2016

(87) PCT Pub. No.: WO2015/024092
PCT Pub. Date: Feb. 26, 2015

(65) Prior Publication Data
US 2016/0165329 A1  Jun. 9, 2016

(51) Int. Cl.
*H04B 1/00* (2006.01)
*H04R 1/02* (2006.01)
(Continued)

(52) U.S. Cl.
CPC .......... *H04R 1/026* (2013.01); *B60R 11/0217* (2013.01); *B63B 17/00* (2013.01);
(Continued)

(58) Field of Classification Search
CPC .... H04R 2499/13; H04R 7/045; H04R 1/025; H04R 1/028; H04R 1/026
(Continued)

(56) References Cited

U.S. PATENT DOCUMENTS 3,567,870 A  3/1971  Rivera
3,728,497 A  4/1973  Komatsu
(Continued)

OTHER PUBLICATIONS

International Searching Authority, International Search Report and Written Opinion dated Apr. 30, 2014, Application Serial No. PCT/CA2013/00734.

*Primary Examiner* — Alexander Jamal
(74) *Attorney, Agent, or Firm* — Bereskin & Parr LLP

(57) ABSTRACT

Disclosed herein is a personal watercraft that includes a hull including a deflectable panel having an interior surface and an exterior surface, an audio source for generating an audio signal, and an audio tactile transducer mounted to the interior surface of the deflectable panel. The audio tactile transducer includes a transducer enclosure, an audio generating device within the transducer enclosure, and an audio input for transmitting the audio signal from the audio source to the audio generating device. The audio generating device is configured to vibrate the deflectable panel based upon the audio signal in order to generate audible sound emanating from the exterior surface of the deflectable panel. The personal watercraft also includes a protective outer shell surrounding the transducer enclosure.

26 Claims, 16 Drawing Sheets

(51) Int. Cl.
  *B63B 17/00* (2006.01)
  *B60R 11/02* (2006.01)
  *B63B 35/73* (2006.01)
  *H04R 9/06* (2006.01)
  *H04R 7/04* (2006.01)

(52) U.S. Cl.
  CPC ........... *B63B 35/731* (2013.01); *H04R 1/025* (2013.01); *H04R 1/028* (2013.01); *H04R 9/06* (2013.01); *H04R 7/045* (2013.01); *H04R 2499/13* (2013.01)

(58) Field of Classification Search
  USPC .................. 381/86, 332, 152, 190, 396, 117
  See application file for complete search history.

(56) References Cited

U.S. PATENT DOCUMENTS

| | | |
|---|---|---|
| 4,058,075 A | 11/1977 | Piper, Sr. |
| 4,392,027 A | 7/1983 | Bock |
| 4,514,599 A | 4/1985 | Yanagishima |
| 5,532,980 A | 7/1996 | Zarate et al. |
| 5,570,322 A | 10/1996 | Miller |
| 5,624,155 A | 4/1997 | Bluen et al. |
| 5,735,236 A | 4/1998 | Kastner et al. |
| 5,894,810 A | 4/1999 | Orr |
| 6,173,669 B1 | 1/2001 | Staerzl |
| 6,209,472 B1 | 4/2001 | Staerzl |
| 6,356,641 B1 | 3/2002 | Warnaka et al. |
| 7,037,153 B1 | 5/2006 | Wynne |
| 7,211,173 B1 | 5/2007 | Staerzl et al. |
| 7,289,038 B2 | 10/2007 | Watanabe et al. |
| 7,386,137 B2 | 6/2008 | Combest |
| 9,313,570 B1* | 4/2016 | Hagman ................ H04R 1/44 |
| 2001/0012369 A1* | 8/2001 | Marquiss ................ H04R 5/02 381/86 |
| 2003/0070218 A1 | 4/2003 | Gardenier et al. |
| 2007/0171315 A1* | 7/2007 | Aoyama ................ B63B 17/00 348/836 |
| 2010/0092015 A1 | 4/2010 | McPherson |
| 2010/0284554 A1 | 11/2010 | Aston et al. |
| 2011/0308441 A1* | 12/2011 | Peloquin ................ F04B 17/03 114/183 R |

\* cited by examiner

AUDIO SYSTEMS FOR GENERATING SOUND ON PERSONAL WATERCRAFT AND OTHER RECREATIONAL VEHICLES

TECHNICAL FIELD

The embodiments disclosed herein relate to audio systems, and in particular, to audio systems for generating sound on recreational vehicles such as personal watercraft.

BACKGROUND

The use of personal watercraft such as those sold under the brand names Sea-Doo™, Jet Ski™ and WaveRunner™ is a popular recreational activity. In some cases, people enjoy listening to music or other types of audio while using the personal watercraft. Accordingly, it has become more common to modify existing personal watercraft to include aftermarket on-board audio systems. These audio systems typically use conventional speaker cones to generate audio. However, a problem with conventional speaker cones is that they are susceptible to damage. Specifically, waves encountered by the personal watercraft can damage speakers by the sheer impact of the waves, or by having moisture infiltrating the speaker cone. Another problem is that installation of these aftermarket audio systems often involves cutting and drilling into the hull of the watercraft, which can adversely affect structural integrity. Similar issues impede use of audio systems on other recreational vehicles such as snowmobiles, all-terrain vehicles (ATVs), and scooters.

In view of the above, there is a need for improved audio systems for recreational vehicles such as personal watercraft.

SUMMARY

According to some embodiments, there is a personal watercraft that includes a hull including a deflectable panel having an interior surface and an exterior surface, an audio source for generating an audio signal, and an audio tactile transducer mounted to the interior surface of the deflectable panel. The audio tactile transducer includes a transducer enclosure, an audio generating device within the transducer enclosure, and an audio input for transmitting the audio signal from the audio source to the audio generating device. The audio generating device is configured to vibrate the deflectable panel based upon the audio signal in order to generate audible sound emanating from the exterior surface of the deflectable panel. The personal watercraft also includes a protective outer shell surrounding the transducer enclosure.

The audio tactile transducer may be mounted to the interior surface of the hull at a location that is normally above water.

According to some embodiments, there is an audio system for a recreational vehicle having a vehicle body that includes a deflectable panel having an interior surface and an exterior surface. The audio system includes an audio source for generating an audio signal, and an audio tactile transducer for being mounted to the interior surface of the deflectable panel. The audio tactile transducer includes a transducer enclosure, an audio generating device within the transducer enclosure, and an audio input for transmitting the audio signal from the audio source to the audio generating device. The audio generating device is configured to vibrate the deflectable panel based upon the audio signal in order to generate audible sound emanating from the exterior surface of the deflectable panel. The audio system also includes a protective outer shell surrounding the transducer enclosure.

According to some embodiments, there is an audio transducer assembly for generating audible sound from a deflectable panel of a recreational vehicle. The audio transducer assembly includes an audio tactile transducer for being mounted to an interior surface of the deflectable panel. The audio tactile transducer includes a transducer enclosure, an audio generating device within the transducer enclosure, and an audio input for receiving and transmitting an audio signal to the audio generating device. The audio generating device is configured to vibrate the deflectable panel based upon the audio signal in order to generate audible sound emanating from an exterior surface of the deflectable panel. The audio transducer assembly also includes a protective outer shell surrounding the transducer enclosure.

The audio transducer assembly may include a mounting plate for mounting the audio tactile transducer to the interior surface of the deflectable panel.

The mounting plate may include a base plate and a first connector for attachment to a second connector on a base portion of the transducer enclosure. The first connector on the mounting plate may include a threaded stud and the second connector on the base portion of the transducer enclosure may include a threaded sleeve for receiving the threaded stud.

In some embodiments, a gap may be located between the mounting plate and the protective outer shell. In other embodiments, the protective outer shell may abut the mounting plate and may be secured thereto.

In some embodiments, the protective outer shell may surround and engage the transducer enclosure.

The transducer enclosure may include a base portion, an upper portion, and a sidewall extending therebetween. The upper portion may have an outer top surface and the sidewall may have an outer side surface. Furthermore, the protective outer shell may include a top shell portion engaging the outer top surface of the transducer enclosure, and a side shell portion engaging the outer side surface of the transducer enclosure.

The outer side surface of the transducer enclosure may be generally circular, and the side shell portion of the protective outer shell may be circular.

The protective outer shell may include at least one reinforcing rib extending along at least one of the top shell portion and the side shell portion. Furthermore, the at least one reinforcing rib may extend along both the top shell portion and the side shell portion.

The at least one reinforcing rib may include a plurality of reinforcing ribs.

The protective outer shell may be adhered to the transducer enclosure.

The audio generating device of the audio tactile transducer may include a voice coil located within the transducer enclosure and configured to receive the audio signal through the audio input, and a magnet located within the transducer enclosure adjacent to the voice coil. The magnet and the voice coil may be configured to move relative to each other for vibrating the deflectable panel based upon the audio signal in order to generate audible sound emanating from the exterior surface of the deflectable panel.

According to some embodiments, there is a method of installing an audio system on a recreation vehicle having a vehicle body that includes a deflectable panel. The method includes: mounting an audio tactile transducer to an interior surface of the deflectable panel; connecting the audio tactile transducer to an audio source, the audio tactile transducer being configured to receive an audio signal from the audio source; and covering and surrounding the audio tactile transducer with a protective outer shell.

The method may include adhering the protective outer shell to the audio tactile transducer. The protective outer shell may be adhered to the audio tactile transducer using an epoxy. The method may further include curing the epoxy.

The vehicle body may be a hull of a personal watercraft, and the audio tactile transducer may be mounted to the interior surface of the hull at a location that is normally above water.

According to some embodiments, there is a method of operating an audio system on a recreational vehicle having a vehicle body that includes a deflectable panel. The method includes: generating an audio signal; transmitting the audio signal to an audio tactile transducer mounted to an interior surface of the deflectable panel, the audio tactile transducer being surrounded by a protective outer shell; and vibrating the deflectable panel using the audio tactile transducer based upon the audio signal in order to generate audible sound emanating from an exterior surface of the deflectable panel.

The vehicle body may be a hull of a personal watercraft, and the audio tactile transducer may be mounted to the interior surface of the hull at a location that is normally above water such that vibrating the deflectable panel generates audible sound emanating from the exterior surface of the hull above the water.

Other aspects and features will become apparent, to those ordinarily skilled in the art, upon review of the following description of some exemplary embodiments.

BRIEF DESCRIPTION OF THE DRAWINGS

Some embodiments of the present specification will now be described, by way of example only, with reference to the following drawings, in which.

DETAILED DESCRIPTION

Figure 1:
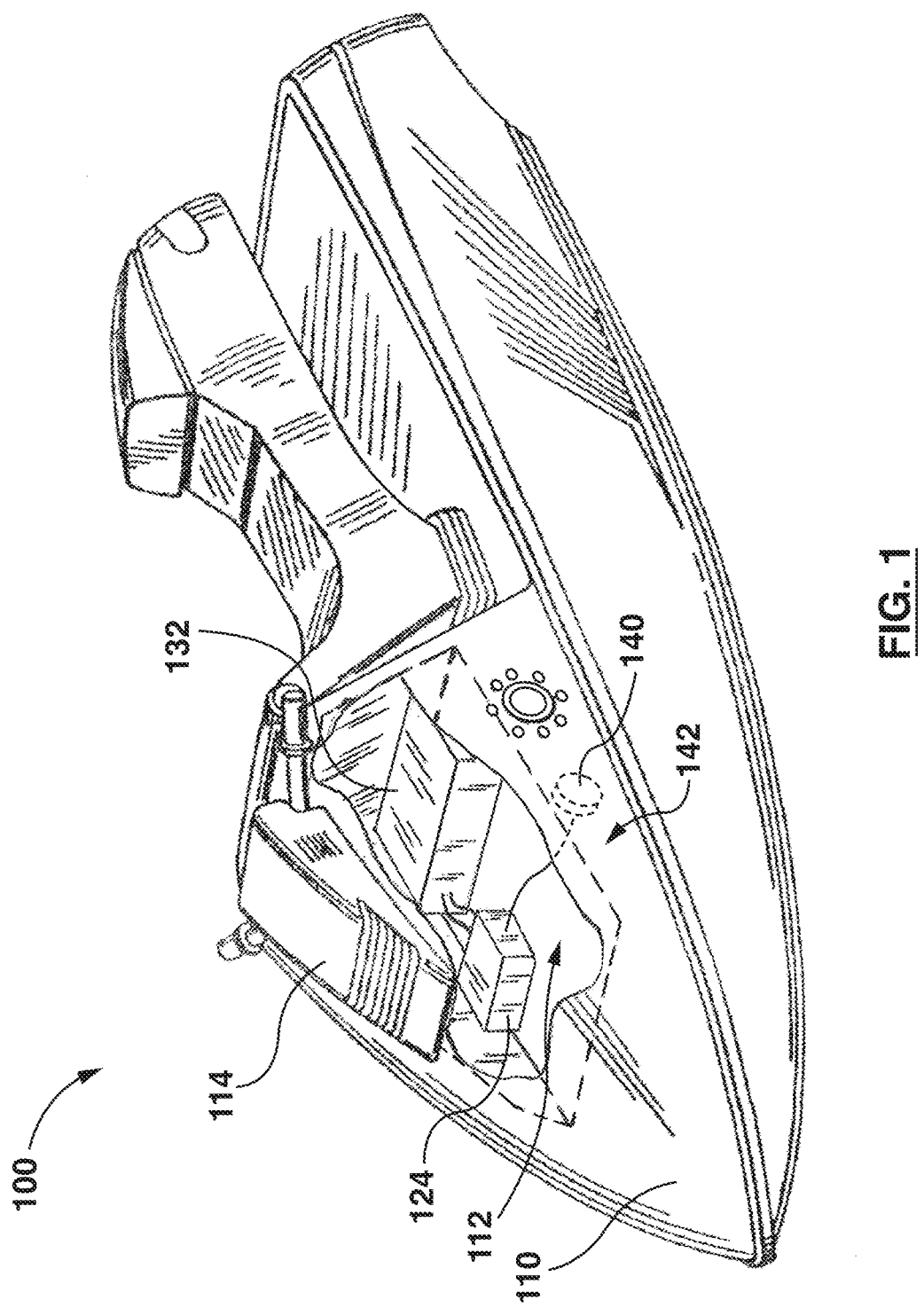
FIG. 1 is a partially sectioned front perspective view of a personal watercraft that includes an audio system according to an embodiment.

Referring to FIG. 1, illustrated therein is a recreational vehicle 100 made in accordance with an embodiment of the present invention. The recreational vehicle 100 includes a vehicle body 110. For example, in the illustrated embodiment, the recreational vehicle 100 is a personal watercraft and the vehicle body 110 is a hull. The recreational vehicle 100 could also be a snowmobile, all-terrain vehicle (ATV), scooter, and the like.

Figure 2:
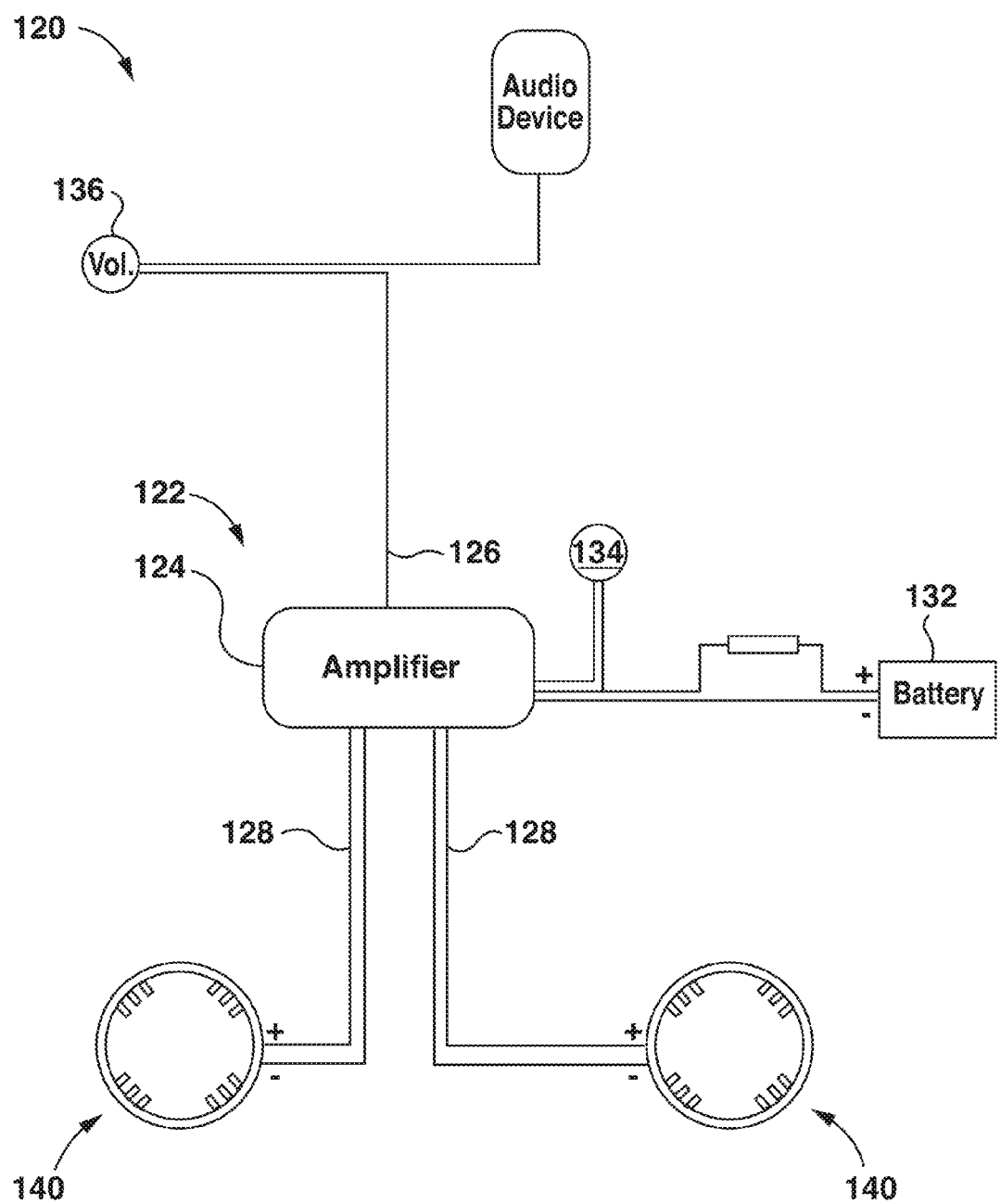
FIG. 2 is a schematic diagram of the audio system shown in FIG. 1.

Referring now to FIG. 2, the recreational vehicle 100 includes an audio system 120. The audio system 120 includes an audio source 122 for generating an audio signal. For example, as shown, the audio source 122 may include an audio processor such as an audio amplifier 124 configured to receive a low-power audio signal 126 and output one or more amplified audio signals 128. The low-power audio signal 126 may be generated by a personal audio device 130 such as a digital audio player (e.g. an iPod™ device), a mobile phone, tablet computer, or another audio device. The amplifier 124 may be connected to a power source 132 such as an on-board vehicle battery, and may include a power switch 134. The audio source 122 may also include a volume controller 136.

As shown in FIG. 1, the amplifier 124, the power source 132, and other components of the audio source 122 may be located within a storage compartment 112 of the vehicle body 110. The vehicle body 110 may include a removable cover 114 that provides access to the storage compartment 112. The cover 114 may provide a water-resistant seal.

Figure 3:
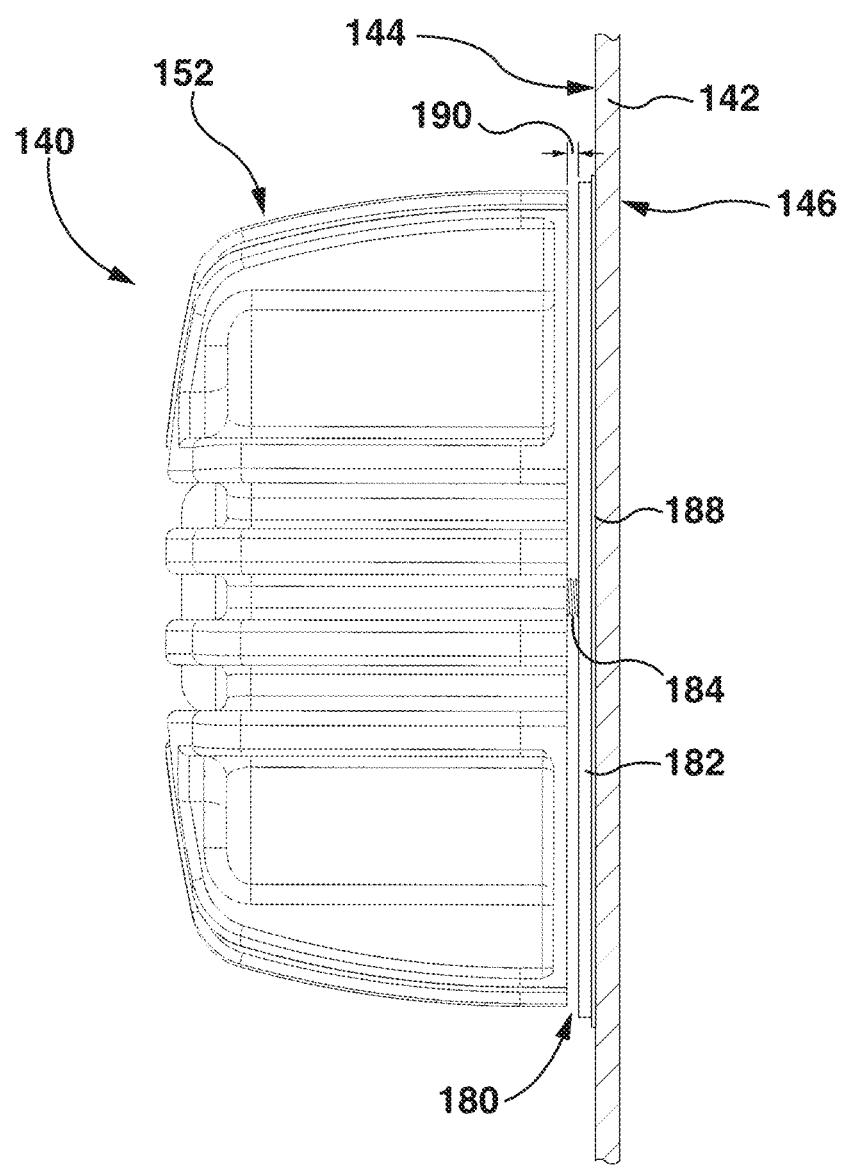
FIG. 3 is a cross-sectional view of an audio transducer assembly mounted to an interior surface of the hull of the personal watercraft of FIG. 1.

Referring to FIGS. 1-3, the audio system 120 includes one or more audio transducer assemblies 140. As shown in FIGS. 1 and 3, each audio transducer assembly 140 is mounted to a deflectable panel 142 of the vehicle body 110 and is configured to vibrate the deflectable panel 142 in order to generate audio. More particularly, as shown in FIG. 3, the deflectable panel 142 has an interior surface 144 and an exterior surface 146, and the audio transducer assembly 140 is mounted to the interior surface 144. In use, the audio transducer assembly 140 receives the audio signal from the audio source and vibrates the deflectable panel 142 to generate audible sound emanating from the exterior surface 146 of the deflectable panel 142.

The deflectable panel 142 is generally a semi-rigid panel that is flexible, yet resilient. For example, as shown, the deflectable panel 142 may be a portion of a hull of a personal watercraft, which may be made from a composite such as fiber glass. In other embodiments, the deflectable panel 142 could be made from other materials such as plastics or metals.

As shown in the illustrated embodiment, the audio transducer assembly 140 may be mounted to the hull at a location that is normally above water. This may help generate audio that can be heard by a person riding the personal watercraft.

Figure 4:
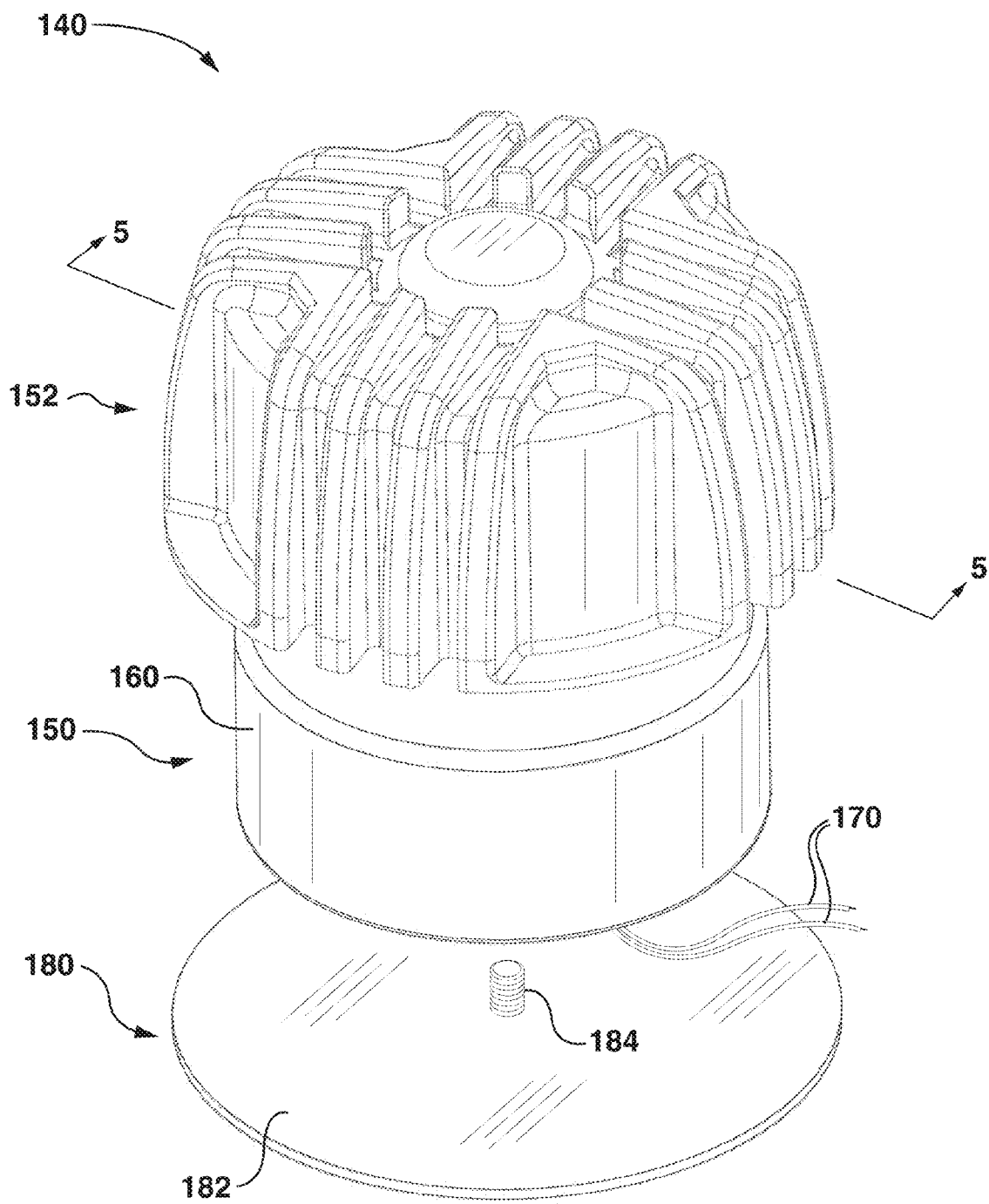
FIG. 4 is an exploded perspective view of the audio transducer assembly of FIG. 3.
Figure 5:
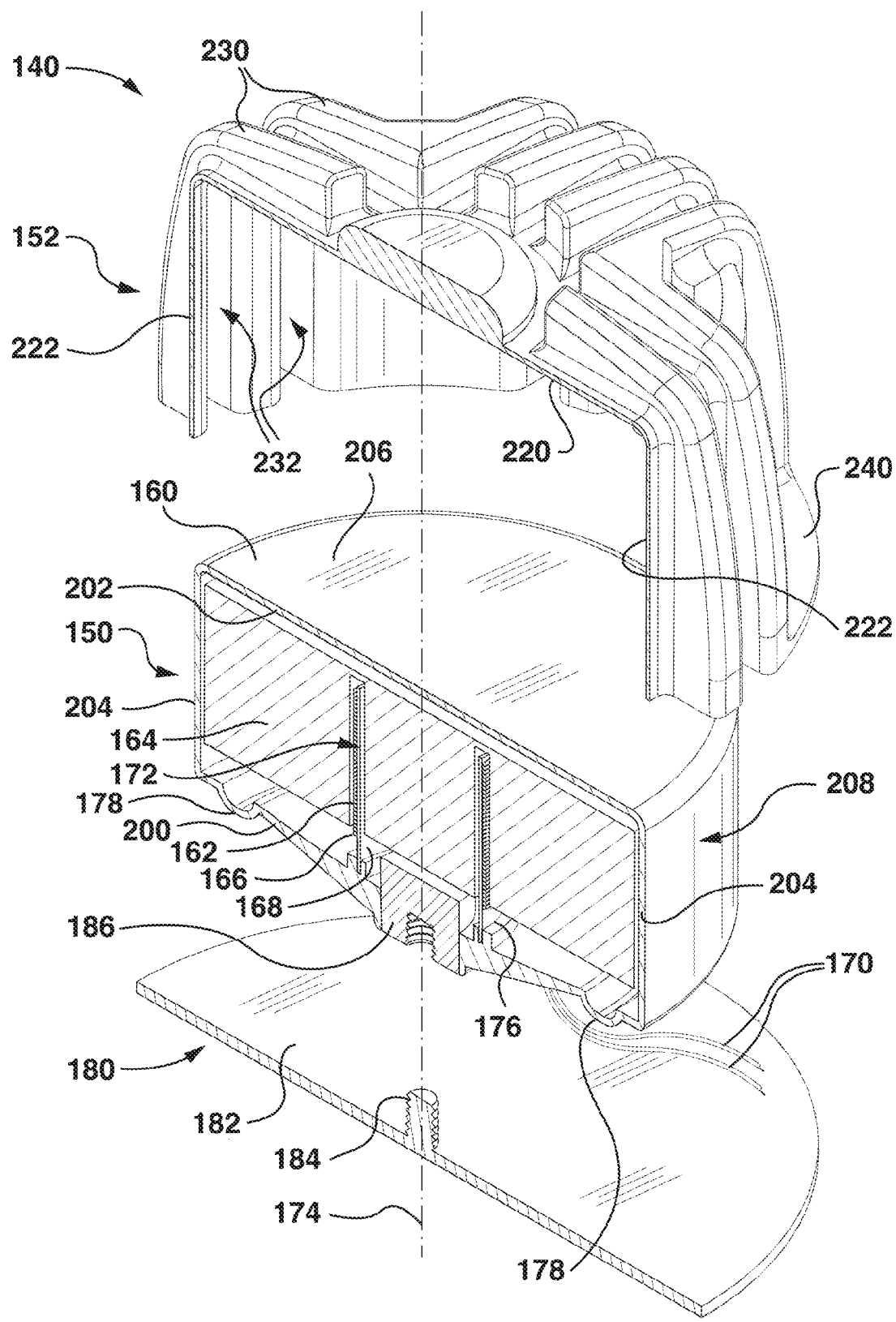
FIG. 5 is an exploded cross-sectional perspective view of the audio transducer assembly of FIG. 4 along the line 5-5.

Referring now to FIGS. 4 and 5, each audio transducer assembly 140 includes an audio tactile transducer 150, and a protective outer shell 152 that surrounds the audio tactile transducer 150. The protective outer shell 152 reinforces the audio tactile transducer 150, which can help prevent internal or external damage to the audio tactile transducer 150, and can thereby reduce the likelihood of premature failure of the audio tactile transducer 150. This can be particularly beneficial when using the audio tactile transducer 150 on a recreational vehicle 100 because, when operating and maneuvering the recreational vehicle, the vehicle often encounters external forces that might otherwise cause damage to the audio tactile transducer. For example, a personal watercraft often encounters and impacts waves, which generate horizontal or vertical forces throughout the hull. These forces may be transmitted to the audio tactile transducer 150 and could cause damage to the audio tactile transducer 150. The protective outer shell 152 can reinforce the audio tactile transducer 150 and prevent or reduce the amount of damage.

Referring now to FIG. 5, the audio tactile transducer 150 includes a transducer enclosure 160, and an audio generating device such as a voice coil 162 and a magnet 164. Both the voice coil 162 and the magnet 164 are located within the transducer enclosure 160 generally adjacent to each other. The audio tactile transducer 150 also includes an audio input such as input wires 170 for transmitting the audio signal from the audio source 122 to the audio generating components.

As shown, the transducer enclosure 160 includes a base portion 200, an upper portion 202, and a sidewall 204 extending therebetween. An internal cavity is located between the base portion 200 and the upper portion 202 for receiving the voice coil 162 and the magnet 164.

The voice coil 162 includes one or more electrical windings 166 wound on a non-conductive tube 168. The voice coil 162 is configured to receive the audio signal from the audio source 122 through an audio input. For example, in the illustrated embodiment, the input wires 170 are connected to the electrical windings 166 and extend outside the transducer enclosure 160 for receiving and transmitting the audio signal to the voice coil 162.

The magnet 164 may be a permanent magnet such as a Neodymium magnet. Furthermore, the magnet 164 may have an annular slot 172 for receiving the voice coil 162. In other examples, the magnet 164 could have other shapes such as a tube-shaped magnetic with the voice coil 162 received in the center thereof.

The audio generating device (e.g. the voice coil 162 and the magnet 164) is configured to vibrate the deflectable panel 142 based upon the audio signal in order to generate audible sound emanating from the exterior surface 146 of the deflectable panel 142. More particularly, the voice coil 162 and the magnet 164 are configured to move relative to each other during operation. This relative movement transmits vibrations to the deflectable panel 142. For example, in use, the audio signal applied to the electrical windings 166 of the voice coil 162 generates an electromagnetic field that interacts with the magnetic field of the magnet 164. This interaction induces relative motion between the voice coil 162 and the magnet 164, which in turn, vibrates the deflectable panel 142 and pressurizes air around the deflectable panel 142 to generate audible sound based on the audio signal.

In the illustrated embodiment, the magnet 164 is stationary and the voice coil 162 is moveable. More particularly, the magnet 164 is held stationary within the transducer enclose 160 (e.g. the magnet 164 is secured to the upper portion 202 and the sidewall 204). In contrast, the voice coil 162 is mounted to the base portion 202 of the transducer enclosure 160, which is configured to flex and move relative to the sidewalls 204 and the upper portion 202 of the transducer enclosure 160. More specifically, the non-conductive tube 168 of the voice coil 162 is secured to an annular ridge 176 on the base portion 200, and the base portion 200 has a thinned wall portion 178 extending around the annular ridge 176. As shown, the thinned wall portion 178 may have a U-shaped profile. In operation, the thinned wall portion 178 allows the base portion 200 to flex along a longitudinal axis 174 while the voice coil 162 moves within the annular slot 172 of the magnet 164. Accordingly, relative movement between the voice coil 162 and the magnet 164 causes vibrations that are transferred to the deflectable panel 142 through the base portion 200 of the transducer enclosure 160.

The mass of the non-moving portions of the transducer 150 (e.g. the magnet 164) is generally selected to have a much heavier weight than the moving portions (e.g. the voice coil 162). With this configuration, the non-moving portions resist vibration, while the moving portions tend to transfer vibrations to the deflectable panel 142.

In other embodiments, the magnet 164 may be moveable and the voice coil 162 may be stationary. Furthermore, while the illustrated embodiment shows a single voice coil and magnet, the audio tactile transducer 150 may include other configurations, which may include one or more voice coils, and one or more magnets.

In some embodiments, the audio tactile transducer may be a SpaTFX Premium Audio tactile transducer sold by PQN Enterprises, Inc. These transducers have a weight of about 1.5 lbs, a frequency response of about 20-20 kHz, an impedance of about 6 ohms, and a maximum rated power of about 50 watts. However, other types of audio tactile transducers could be used such as a Vidsonix™ transducer model no. VX-GH72, Research Electronics International (REI™) transducer model no. TRN-2000, or a Rolen Star transducer sold by Invisible Stereo U.S.A. Furthermore, the size, type, frequency response, and power may be different depending on numerous factors such as the application and desired performance.

As shown in FIGS. 3-5, the audio transducer assembly 140 may also include a mounting plate 180 for mounting the audio tactile transducer 150 to the deflectable panel 142 of the vehicle body 110. The mounting plate 180 includes a base plate 182 and a first connector 184 for attachment to a corresponding second connector 186 on the transducer enclosure 160. As shown, the base plate 182 is a circular disc and the first connector 184 is a threaded stud located centrally thereon. The second connector 186 on the audio tactile transducer 150 is a threaded sleeve configured to receive the threaded stud of the mounting plate 180. The threaded sleeve may be a brass insert that is sonic welded or otherwise secured to the base portion 200 of the transducer enclosure 160. Furthermore, the voice coil 162 may be mounted to the brass insert (e.g. through the non-conductive tube 168 and the base portion 200). The threaded sleeve could also be made from other metals or other materials. The mounting plate 180 may be made from a metal such as aluminum or another suitable material.

Referring to FIG. 3, the mounting plate 180 and the transducer enclosure 160 may be configured to provide a gap 190 located between the mounting plate 180 and the protective outer shell 152. For example, the gap 190 may be less than about 10-millimeters, however, other gaps sizes may be possible and may depend on factors such as the type of tactile transducer used and the application thereof. The gap 190 is believed to help enable reproduction of audible frequencies without physical restrictions. In some cases, the gap size may be selected to avoid or reduce deflection of the tactile transducer about the longitudinal axis 174.

In other embodiments, the protective outer shell 152 may be configured to abut the mounting plate 180 or the deflectable panel 142, and in some cases, may be secured thereto, for example, using fasteners such as screws or bolts, or using an adhesive such as epoxy. Securing the protective outer shell 152 to the mounting plate 180 or the deflectable panel 142 can help to further reinforce the audio tactile transducer 150 and prevent pivoting about the longitudinal axis 174 (e.g. at the connection between the threaded sleeve and threaded stud). When securing the protective outer shell 152 to the mounting plate 180, the protective outer shell 152 may be made from a material having some degree of flexibility to allow relative movement between the tactile transducer 150 and the deflectable panel 142. This may enable sound generation at suitable power levels and frequency responses.

Referring now to FIGS. 5-10, the protective outer shell 152 will now be described in greater detail.

The protective outer shell 152 may be made from a rigid or semi-rigid material such as a composite, plastic, or metal. More particularly, in the illustrated embodiment, the protective outer shell 152 is made from a fiber-reinforced plastic such as glass filled nylon.

As described above, the protective outer shell 152 is configured to surround the audio tactile transducer 150. More specifically, in the illustrated embodiment, the protective outer shell 152 covers and surrounds the top and sides of the transducer enclosure 160. Furthermore, in some cases, the protective outer shell 152 may be in contact with, or otherwise engage the transducer enclosure 160. More particularly, the protective outer shell 152 may be adhered to the transducer enclosure 160, as will be described in greater detail below.

As shown FIG. 5, the upper portion 202 of the transducer enclosure 160 has an outer top surface 206 opposite to the base portion 200, and the sidewalls 204 have an outer side surface 208. Furthermore, the protective outer shell 152 includes a top shell portion 220 and a side shell portion 222. The top shell portion 220 and the side shell portion 222 cooperate to cover and surround the transducer enclosure 160, and in some cases may engage the outer top surface 206 and the outer side surface 208 of the transducer enclosure 160, respectively. More specifically, the top shell portion 220 may be adhered to the outer top surface 206, and the side shell portion 222 may be adhered to the outer side surface 208, for example, using epoxy. Adhering the protective outer shell 152 to the transducer enclosure 160 may help to reinforce or otherwise prevent damage to the audio tactile transducer 150.

As shown in the illustrated embodiment, both the outer side surface 208 of the transducer enclosure 160, and the side shell portion 222 of the protective outer shell 152 may be generally circular. With this circular configuration, the protective outer shell 152 can be particularly helpful in reinforcing the transducer enclosure 160 as it can provide enhanced tensile strength to resist radial stresses or hoop stresses that might otherwise cause damage to the audio tactile transducer 150.

The protective outer shell 152 may also include one or more ribs 230 extending along the top shell portion 220 or the side shell portion 222. For example, in the illustrated embodiment, the ribs 230 extend generally outward from the center of the top shell portion 220 and down along the side shell portion 222. The ribs 230 may help reinforce the transducer enclosure 160.

Furthermore, in some cases, the ribs 230 can help provide a gripping surface that helps users install the audio transducer assembly 140 on the deflectable panel 142. For example, the ribs 230 can function as a tactile element that assists users in mounting the audio tactile transducer 150 on interior surfaces of the hull that are difficult to see.

Figure 7:
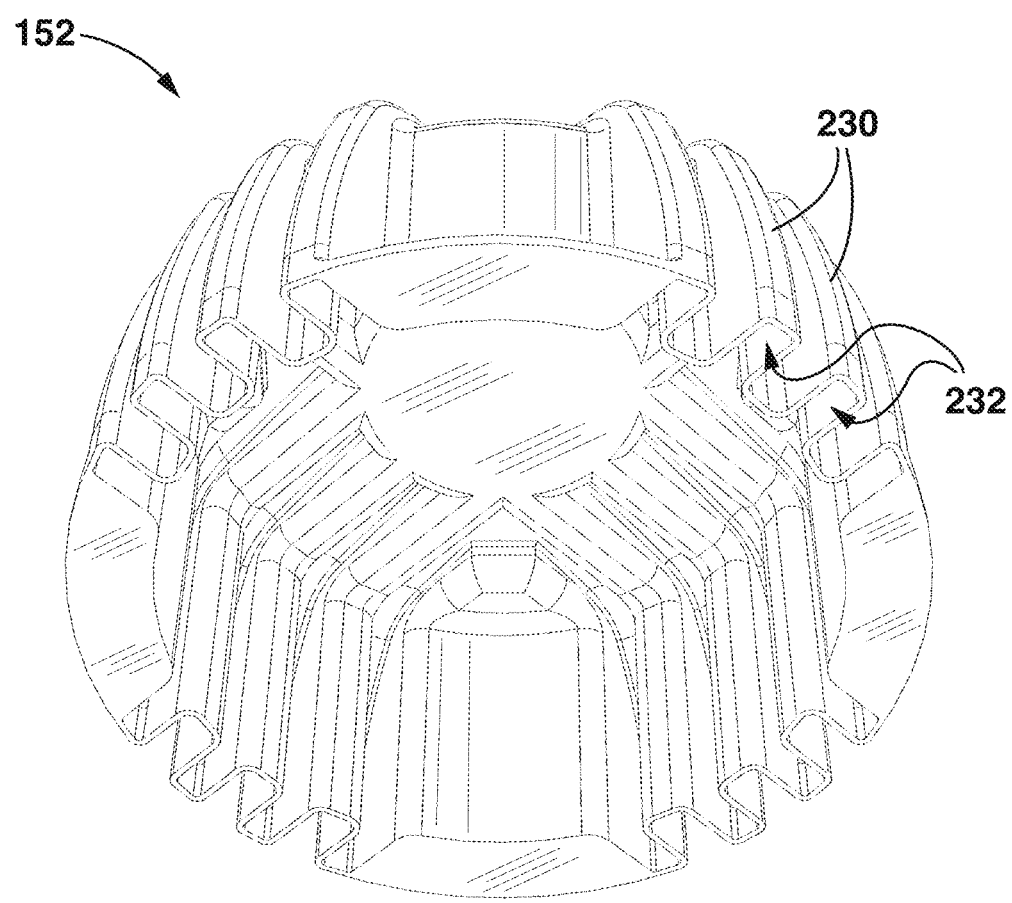
FIG. 7 is a bottom perspective view of the protective outer shell of FIG. 6.
Figure 8:
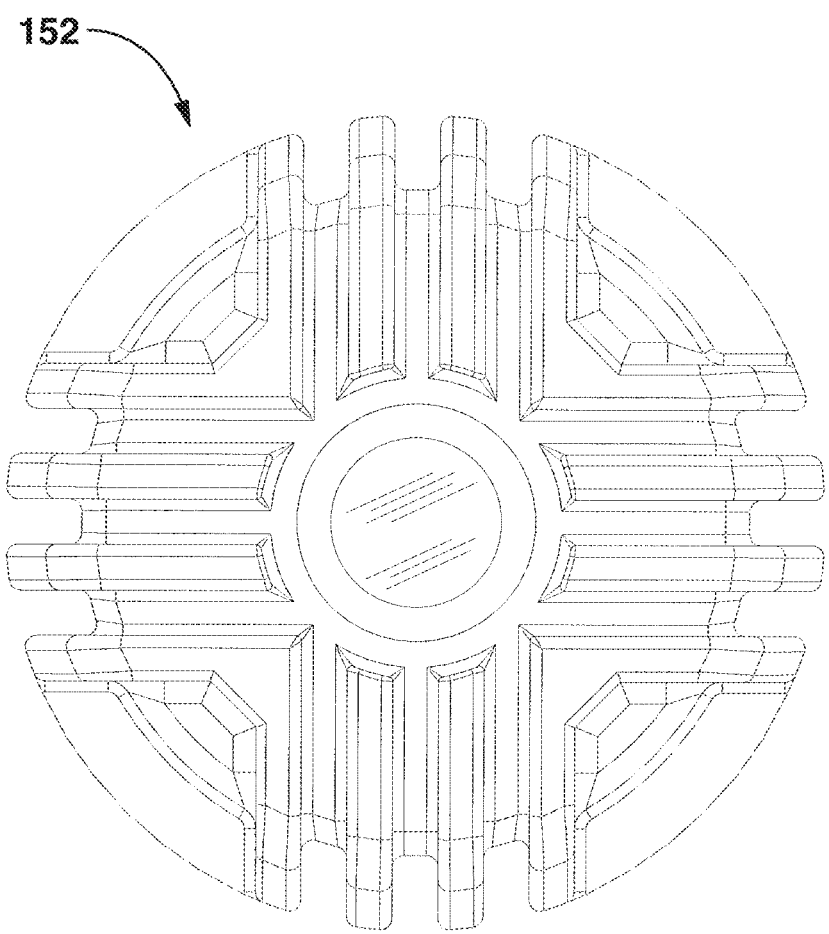
FIG. 8 is a top plan view of the protective outer shell of FIG. 6.
Figure 9:
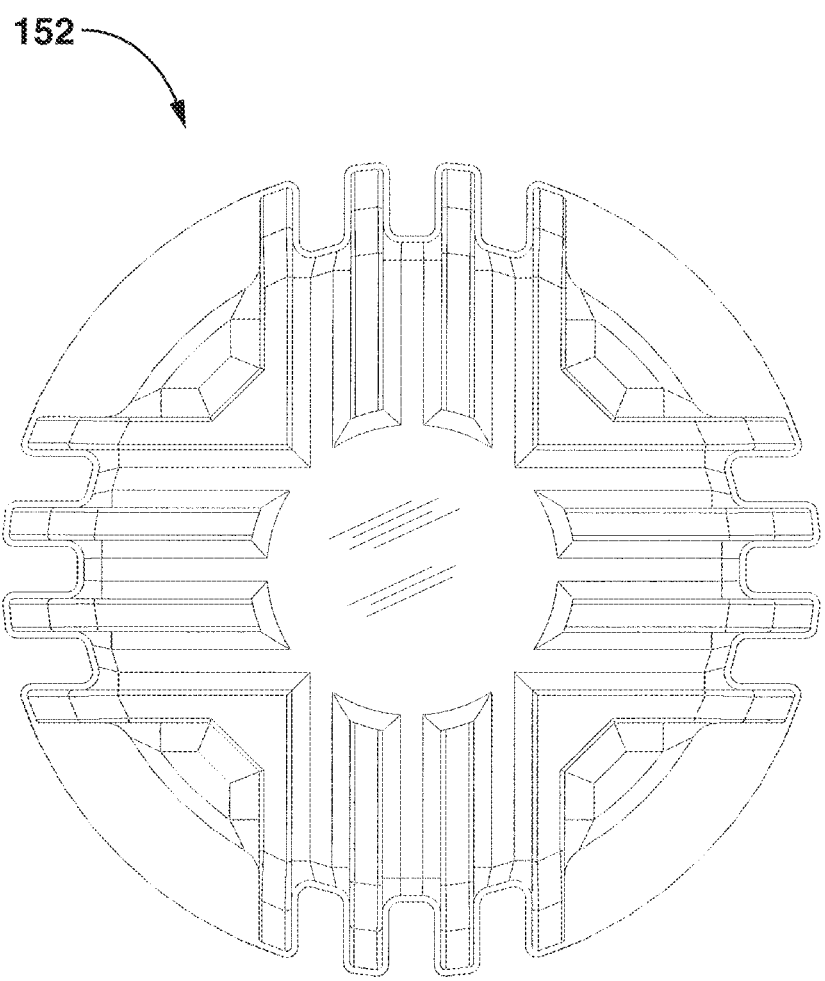
FIG. 9 is a bottom plan view of the protective outer shell of FIG. 6.
Figure 10:
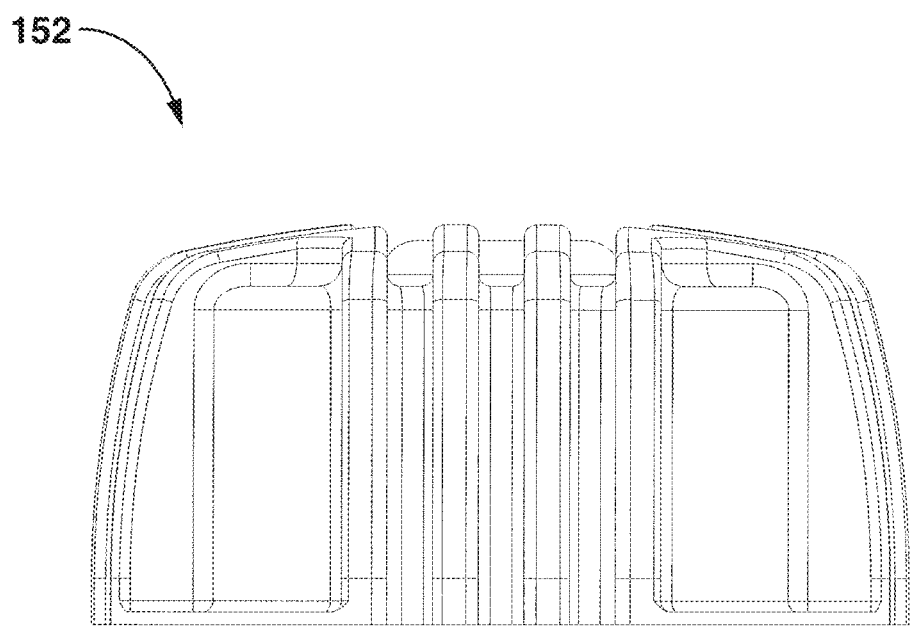
FIG. 10 is a side elevational view of the protective outer shell of FIG. 6.

The ribs 230 may also help cool electronic components of the audio tactile transducer 150. For example, as shown in FIGS. 5 and 7, one or more of the ribs 230 may have interior channels 232. These channels 232 may allow air or another coolant to circulate around the outer top surface 206 and outer side surface of the transducer enclosure 160 to further promote cooling. Furthermore, the ribs 230 themselves may provide additional surface area to enhance cooling, with or without the interior channels 232.

Figure 6:
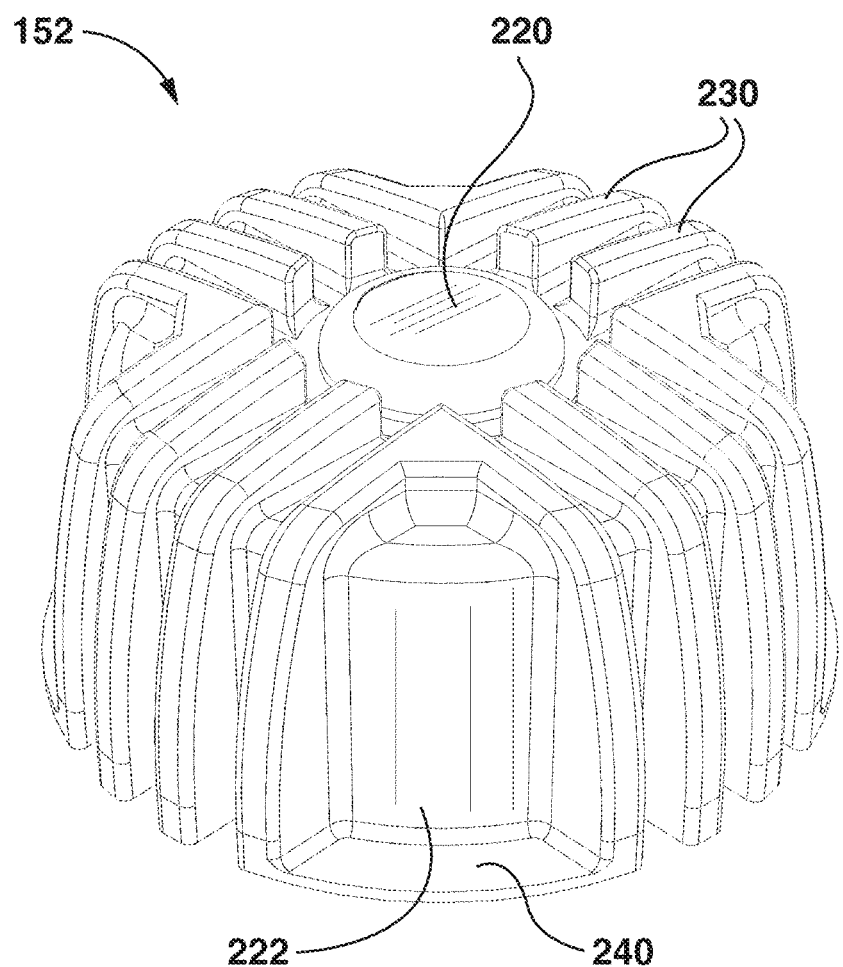
FIG. 6 is a top perspective view of a protective outer shell of the audio transducer assembly of FIG. 3.

Referring to FIG. 6, the protective outer shell 152 may include a lower lip 240 at the bottom of the side shell portion 222. The lower lip 240 may be used to secure the protective outer shell 152 to the mounting plate 180 or the deflectable panel 142. For example, fasteners such as bolts may extend through the lower lip 240 for securing the protective outer shell 152 in place, or the lower lip 240 may be secured in place using an adhesive such as epoxy.

As described above, the protective outer shell 152 can help reinforce the audio tactile transducer 150. More specifically, when operating a recreational vehicle such as a personal watercraft, the audio tactile transducer 150 may be subjected to lateral stresses. For example, riding a personal watercraft up and down over waves may generate lateral stresses within the audio tactile transducer 150 that are transverse to the longitudinal axis 174 (i.e. the axis that transducer vibrations are normally transmitted along). Over time, these lateral stresses may damage the audio tactile transducer 150. In some cases, the protective outer shell 152 may reinforce the audio tactile transducer 150, which may help reduce lateral stresses within the audio tactile transducer 150 and inhibit damage thereto.

Figure 11:
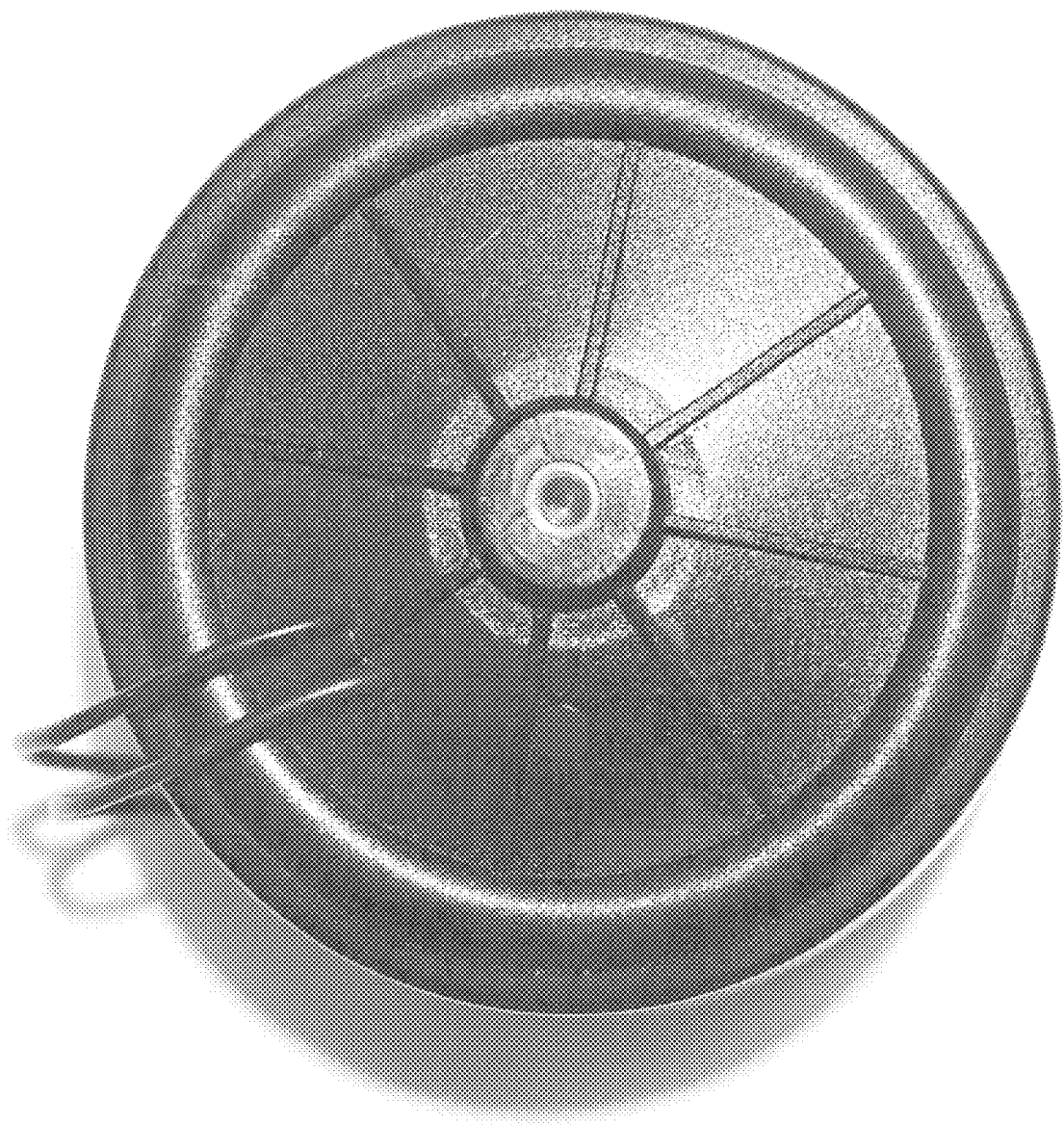
FIG. 11 is a photograph of an audio tactile transducer without a protective outer shell after 3-hours of use on a personal watercraft.
Figure 12:
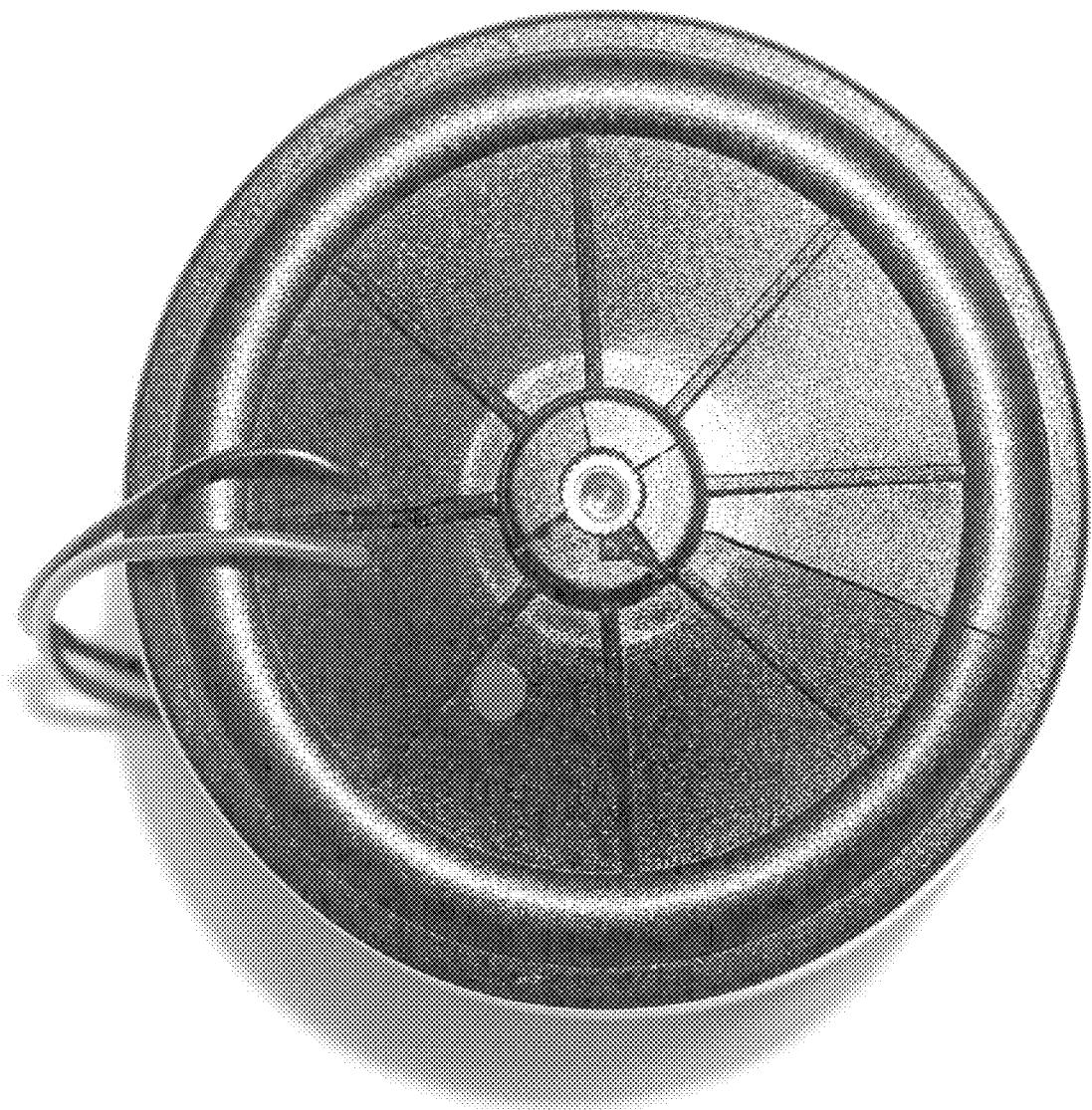
FIG. 12 is a photograph of the audio tactile transducer of FIG. 11 after 6-hours of use on the personal watercraft.
Figure 13:
FIG. 13 is a photograph of the audio tactile transducer of FIG. 11 after 8-hours of use on the personal watercraft.
Figure 14:
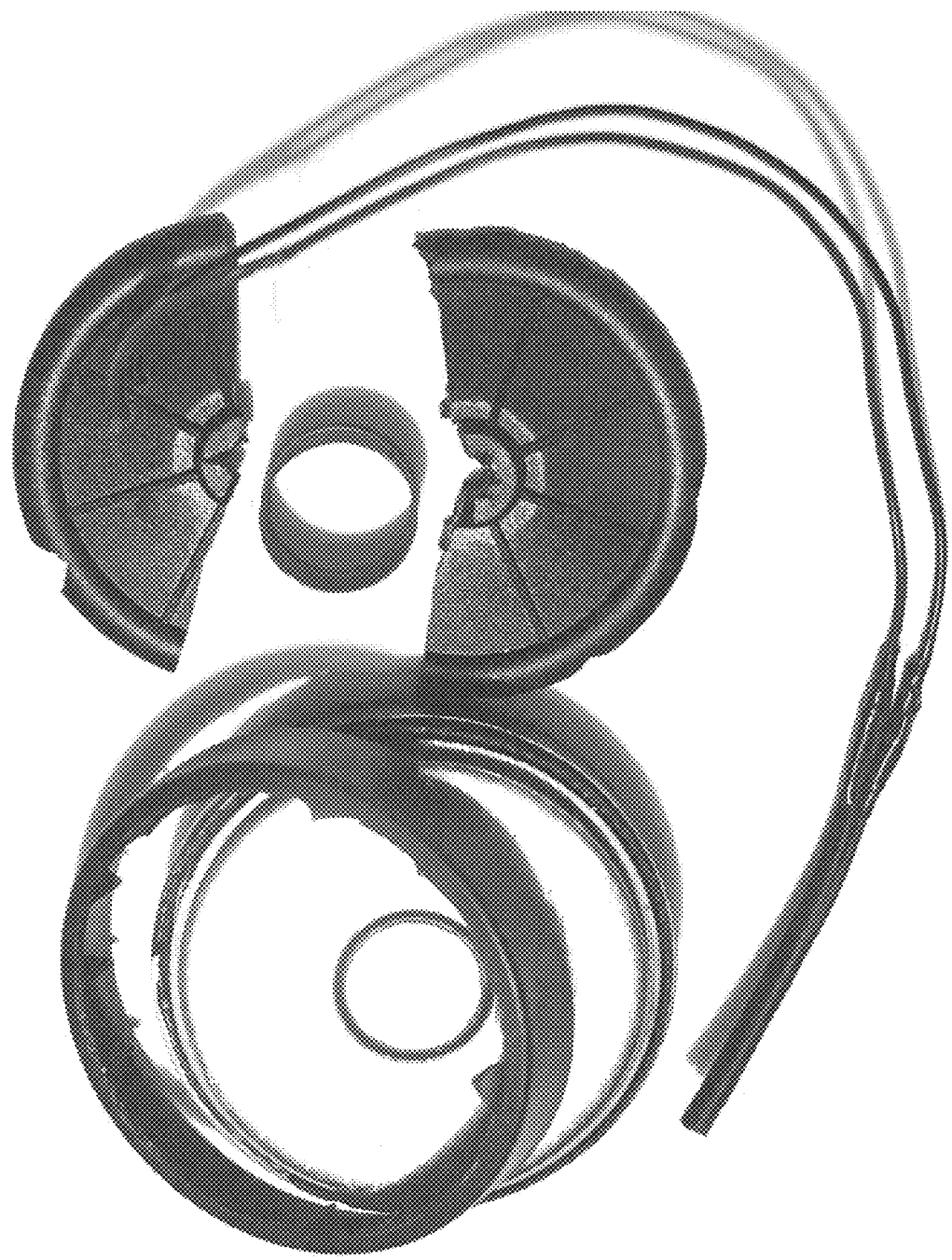
FIG. 14 is a photograph of the audio tactile transducer of FIG. 11 after 8-hours of use on the personal watercraft.

With reference to FIGS. 11-14, testing was completed using the tactile transducer 150 on a personal watercraft, with and without the protective outer shell 152. Without the protective outer shell 152, after approximately 3-hours of use, cracks began to form on the transducer enclosure 160 around the threaded sleeve (i.e. the second connector 186). These cracks are shown in FIG. 11. With reference to FIG. 12, after approximately 6-hours of use, the cracks grew in size and a large piece of the enclosure chipped off. With reference to FIGS. 13 and 14, after approximately 8-hours of use, the transducer enclosure 160 split in half along the cracks and rendered the audio tactile transducer 150 unusable. In contrast, when using the protective outer shell 152, the audio tactile transducer 150 could sustain prolonged use without developing significant cracks or other damage.

The above-noted benefit can be particularly beneficial for audio tactile transducers 150 that are placed on moving (i.e. non-stationary) surfaces, which is common with recreational vehicles. Specifically, when mounting the audio tactile transducer to a deflectable panel of the vehicle, the protective outer shell can reinforce the audio tactile transducer, while also allowing the audio tactile transducer to generate audible sound emanating from the deflectable panel.

While the illustrated embodiment shows the protective outer shell 152 with the top shell portion 220 and the side shell portion 222, in some embodiments the top shell portion 220 may be omitted. In this case, the side shell portion 222 may still reinforce the tactile transducer 150, for example, by reducing radial stresses or hoop stresses.

Figure 15:
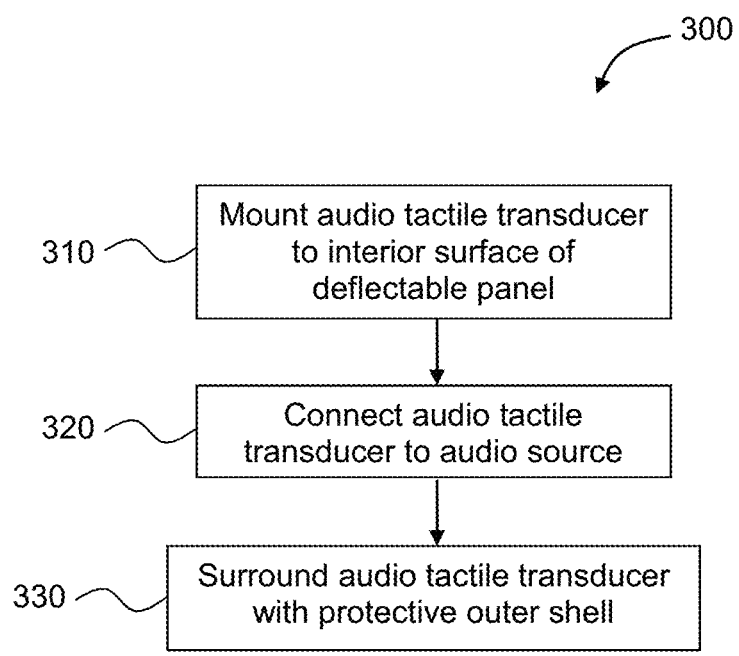
FIG. 15 is a flow chart illustrating a method of installing an audio system on a recreation vehicle according to another embodiment.

Referring now to FIG. 15, illustrated therein is a method 300 of installing an audio system on a recreation vehicle having a vehicle body that includes a deflectable panel such as a hull of a personal watercraft. The method 300 includes steps 310-330, described as follows.

Step 310 includes mounting an audio tactile transducer to an interior surface of the deflectable panel of the recreational vehicle. For example, the audio tactile transducer 150 may be mounted to the interior surface 144 of the hull of a personal watercraft, and may be mounted at a location that is normally above water.

In some embodiments, a mounting plate may be used to mount the audio tactile transducer 150 to the deflectable panel 142. For example, the mounting plate 180 may be secured to the deflectable panel using an adhesive such as epoxy, or another type of fastener. Furthermore, the audio tactile transducer 150 may be attached to mounting plate, for example, using a threaded connection therebetween.

Step 320 includes connecting the audio tactile transducer to an audio source. Furthermore, the audio tactile transducer is configured to receive an audio signal from the audio source. For example, the audio tactile transducer 150 may be connected to an audio amplifier 124 using the input wires 170.

Step 330 includes surrounding the audio tactile transducer with a protective outer shell. For example, the protective outer shell 152 may be placed over the top and sides of the audio tactile transducer 150. Step 330 may occur before, during, or after steps 310 and 320.

In some embodiments, step 330 may include adhering the protective outer shell to the audio tactile transducer, for example, using an epoxy. In this case, the epoxy or other adhesive may be applied to the inside of the protective outer shell 152 in areas where it will contact the transducer enclosure 160. Afterwards, the protective outer shell 152 may be pressed over the transducer enclosure 160 until there is solid contact between the surfaces. This may promote better bonding. The epoxy can then be allowed to cure over an appropriate curing time prior to using the audio tactile transducer on the recreational vehicle. The curing time may be about 24-hours for many standard epoxies; however, shorter or longer curing times are possible.

Figure 16:
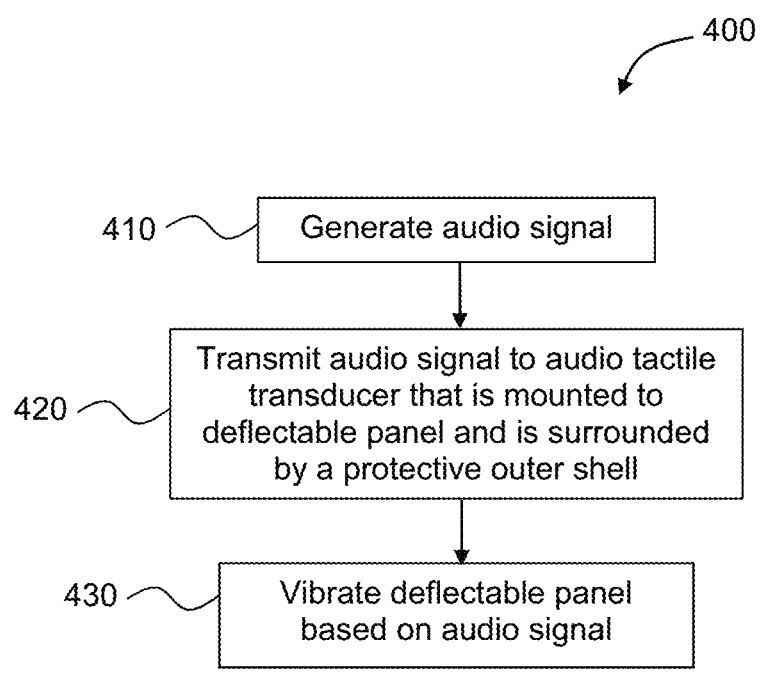
FIG. 16 is a flow chart illustrating a method of operating an audio system on a recreational vehicle according to another embodiment.

Referring now to FIG. 16, illustrated therein is a method 400 of operating an audio system on a recreational vehicle having a vehicle body that includes a deflectable panel, such as a hull of a personal watercraft. The method 400 includes steps 410-430, described as follows.

Step 410 includes generating an audio signal. For example, the audio signal may be generated by an audio source such as the audio amplifier 124.

Step 420 includes transmitting the audio signal to an audio tactile transducer that is mounted to an interior surface of the deflectable panel of the vehicle body. Furthermore, the audio tactile transducer is surrounded by a protective outer shell. For example, the audio signal may be transmitted to the audio tactile transducer 150 through electrical wires, and the audio tactile transducer may be covered and surrounded by the protective outer shell 152.

Step 430 includes vibrating the deflectable panel using the audio tactile transducer based upon the audio signal in order to generate audible sound emanating from an exterior surface of the deflectable panel. For example, when the voice coil 162 of the audio tactile transducer 150 receives the audio signal, the voice coil 162 may generate an electromagnetic field that interacts with the magnetic field of the magnet 164 to cause relative motion therebetween. This motion vibrates the deflectable panel 142, which pressurizes air around the deflectable panel 142 to generate audible sound.

In some embodiments, the audio tactile transducer may be mounted to an interior surface of the hull of a personal watercraft at a location that is normally above water. In this case, the audio tactile transducer may generate audible sound that emanates from an exterior surface of the deflectable panel above the water.

Mounting the audio tactile transducer to the interior surface can also help protect the audio tactile transducer from water damage, and in some cases, can help conceal the audio tactile transducer, which may deter theft.

While the embodiments referred to above describe mounting the audio tactile transducer to the interior surface of a deflectable panel on a recreational vehicle for generating audible sound emanating from the exterior surface, the audio tactile transducer could be mounted to other surfaces. For example, the audio tactile transducer could be mounted to an interior or exterior surface of a car to generate audible sound within the car. A similar configuration could be used to generate audible sound within other vehicles such as planes, trains, subway cars, and the like.

While the above description provides examples of one or more apparatus, methods, or systems, it will be appreciated that other apparatus, methods, or systems may be within the scope of the claims as interpreted by one of skill in the art.

The invention claimed is:

1. A personal watercraft comprising:
   a) a hull including a deflectable panel having an interior surface and an exterior surface;
   b) an audio source for generating an audio signal;
   c) an audio tactile transducer mounted to the interior surface of the deflectable panel, the audio tactile transducer including: a transducer enclosure, an audio generating device within the transducer enclosure, and an audio input for transmitting the audio signal from the audio source to the audio generating device, the audio generating device being configured to vibrate the deflectable panel based upon the audio signal in order to generate audible sound emanating from the exterior surface of the deflectable panel; and
   d) a protective outer shell surrounding and engaging the transducer enclosure;
   e) wherein the transducer enclosure includes a base portion, an upper portion, and a sidewall extending therebetween, the upper portion having an outer top surface and the sidewall having an outer side surface, and wherein the protective outer shell includes:
      i) a top shell portion engaging the outer top surface of the transducer enclosure; and
      ii) a side shell portion engaging the outer side surface of the transducer enclosure.

2. The personal watercraft of claim 1, further comprising a mounting plate for mounting the audio tactile transducer to the interior surface of the deflectable panel.

3. The personal watercraft of claim 1, wherein the audio tactile transducer is mounted to the interior surface of the hull at a location that is normally above water.

4. The personal watercraft of claim 1, wherein the audio generating device of the audio tactile transducer includes:
   a) a voice coil located within the transducer enclosure and being configured to receive the audio signal through the audio input; and
   b) a magnet located within the transducer enclosure adjacent to the voice coil;
   wherein the magnet and the voice coil are configured to move relative to each other for vibrating the deflectable panel based upon the audio signal in order to generate audible sound emanating from the exterior surface of the deflectable panel.

5. An audio system for a recreational vehicle having a vehicle body that includes a deflectable panel having an interior surface and an exterior surface, the audio system comprising:
 a) an audio source for generating an audio signal;
 b) an audio tactile transducer for being mounted to the interior surface of the deflectable panel, the audio tactile transducer including: a transducer enclosure, an audio generating device within the transducer enclosure, and an audio input for transmitting the audio signal from the audio source to the audio generating device, the audio generating device being configured to vibrate the deflectable panel based upon the audio signal in order to generate audible sound emanating from the exterior surface of the deflectable panel; and
 c) a protective outer shell surrounding and engaging the transducer enclosure;
 d) wherein the transducer enclosure includes a base portion, an upper portion, and a sidewall extending therebetween, the upper portion having an outer top surface and the sidewall having an outer side surface, and wherein the protective outer shell includes:
  i) a top shell portion engaging the outer top surface of the transducer enclosure; and
  ii) a side shell portion engaging the outer side surface of the transducer enclosure.

6. The audio system of claim 5, further comprising a mounting plate for mounting the audio tactile transducer to the interior surface of the deflectable panel.

7. The audio system of claim 5 wherein the audio generating device of the audio tactile transducer includes:
 a) a voice coil located within the transducer enclosure and being configured to receive the audio signal through the audio input; and
 b) a magnet located within the transducer enclosure adjacent to the voice coil;
 wherein the magnet and the voice coil are configured to move relative to each other for vibrating the deflectable panel based upon the audio signal in order to generate audible sound emanating from the exterior surface of the deflectable panel.

8. An audio transducer assembly for generating audible sound from a deflectable panel of a recreational vehicle, the audio transducer assembly comprising:
 a) an audio tactile transducer for being mounted to an interior surface of the deflectable panel, the audio tactile transducer including: a transducer enclosure, an audio generating device within the transducer enclosure, and an audio input for receiving and transmitting an audio signal to the audio generating device, the audio generating device being configured to vibrate the deflectable panel based upon the audio signal in order to generate audible sound emanating from an exterior surface of the deflectable panel; and
 b) a protective outer shell surrounding and engaging the transducer enclosure;
 c) wherein the transducer enclosure includes a base portion, an upper portion, and a sidewall extending therebetween, the upper portion having an outer top surface and the sidewall having an outer side surface, and wherein the protective outer shell includes:
  i) a top shell portion engaging the outer top surface of the transducer enclosure; and
  ii) a side shell portion engaging the outer side surface of the transducer enclosure.

9. The audio transducer assembly of claim 8, further comprising a mounting plate for mounting the audio tactile transducer to the interior surface of the deflectable panel.

10. The audio transducer assembly of claim 9, wherein the mounting plate includes a base plate and a first connector for attachment to a second connector on a base portion of the transducer enclosure.

11. The audio transducer assembly of claim 10, wherein the first connector on the mounting plate includes a threaded stud and the second connector on the base portion of the transducer enclosure includes a threaded sleeve for receiving the threaded stud.

12. The audio transducer assembly of claim 9, wherein a gap is located between the mounting plate and the protective outer shell.

13. The audio transducer assembly of claim 9, wherein the protective outer shell abuts the mounting plate and is secured thereto.

14. The audio transducer assembly of claim 8, wherein the outer side surface of the transducer enclosure is generally circular, and wherein the side shell portion of the protective outer shell is circular.

15. The audio transducer assembly of claim 8, wherein the protective outer shell includes at least one reinforcing rib extending along at least one of the top shell portion and the side shell portion.

16. The audio transducer assembly of claim 15, wherein the at least one reinforcing rib extends along both the top shell portion and the side shell portion.

17. The audio transducer assembly of claim 15, wherein the at least one reinforcing rib includes a plurality of reinforcing ribs.

18. The audio transducer assembly of claim 8, wherein the protective outer shell is adhered to the transducer enclosure.

19. The audio transducer assembly of claim 9, wherein the audio generating device of the audio tactile transducer includes:
 a) a voice coil located within the transducer enclosure and being configured to receive the audio signal through the audio input; and
 b) a magnet located within the transducer enclosure adjacent to the voice coil;
 wherein the magnet and the voice coil are configured to move relative to each other for vibrating the deflectable panel based upon the audio signal in order to generate audible sound emanating from the exterior surface of the deflectable panel.

20. A method of installing an audio system on a recreation vehicle having a vehicle body that includes a deflectable panel, the method comprising:
 a) mounting an audio tactile transducer to an interior surface of the deflectable panel, the transducer having a transducer enclosure, the transducer enclosure having a base portion, an upper portion, and a sidewall extending therebetween, the upper portion having an outer top surface and the sidewall having an outer side surface;
 b) connecting the audio tactile transducer to an audio source, the audio tactile transducer being configured to receive an audio signal from the audio source; and
 c) covering and surrounding the audio tactile transducer with a protective outer shell, the protective outer shell including:
  i) a top shell portion engaging the outer top surface of the transducer enclosure; and ii) a side shell portion engaging the outer side surface of the transducer enclosure.

21. The method of claim 20, furthering comprising adhering the protective outer shell to the audio tactile transducer.

22. The method of claim 21, wherein the protective outer shell is adhered to the audio tactile transducer using an epoxy.

23. The method of claim 22, further comprising curing the epoxy.

24. The method of claim 20, wherein the vehicle body is a hull of a personal watercraft, and the audio tactile transducer is mounted to the interior surface of the hull at a location that is normally above water.

25. A method of operating an audio system on a recreational vehicle having a vehicle body that includes a deflectable panel, the method comprising:
   a) generating an audio signal;
   b) transmitting the audio signal to an audio tactile transducer mounted to an interior surface of the deflectable panel, the audio tactile transducer being surrounded by a protective outer shell, the audio tactile transducer having a transducer enclosure, the transducer enclosure having a base portion, an upper portion, and a sidewall extending therebetween, the upper portion having an outer top surface and the sidewall having an outer side surface, and wherein the protective outer shell includes:
      i) a top shell portion engaging the outer top surface of the transducer enclosure; and
      ii) a side shell portion engaging the outer side surface of the transducer enclosure; and
   c) vibrating the deflectable panel using the audio tactile transducer based upon the audio signal in order to generate audible sound emanating from an exterior surface of the deflectable panel.

26. The method of claim 25, wherein the vehicle body is a hull of a personal watercraft, and the audio tactile transducer is mounted to the interior surface of the hull at a location that is normally above water such that vibrating the deflectable panel generates audible sound emanating from the exterior surface of the hull above the water.

* * * * *